United States Patent [19]
Sekiya et al.

[11] Patent Number: 5,614,287
[45] Date of Patent: Mar. 25, 1997

[54] MAGNETO-OPTICAL RECORDING MEDIUM COMPRISING A SPECIFIED SUBSTRATE

[75] Inventors: Masahiko Sekiya; Utami Yonemura; Kiyoshi Chiba, all of Tokyo, Japan

[73] Assignee: Teijin Limited, Osaka, Japan

[21] Appl. No.: 363,992

[22] Filed: Dec. 27, 1994

Related U.S. Application Data

[63] Continuation of Ser. No. 986,078, Dec. 4, 1992, abandoned.

[30] Foreign Application Priority Data

| Dec. 4, 1991 | [JP] | Japan | 3-347756 |
| Dec. 5, 1991 | [JP] | Japan | 3-348384 |
| Feb. 12, 1992 | [JP] | Japan | 4-025229 |
| Feb. 12, 1992 | [JP] | Japan | 4-025230 |

[51] Int. Cl.$^6$ ............................................. G11B 7/007
[52] U.S. Cl. ...................... 428/163; 428/64.3; 428/64.4; 428/64.7; 428/212; 428/216; 428/336; 428/412; 428/694 NF; 428/694 DE; 428/694 ST; 428/694 SG; 428/900; 369/13
[58] Field of Search ........................ 369/13; 428/694 NF, 428/694 DE, 694 ST, 694 SG, 900, 163, 212, 216, 336, 412, 64.3, 64.4, 64.7

[56] References Cited

U.S. PATENT DOCUMENTS

| 4,679,180 | 7/1987 | Kryder et al. | 369/13 |
| 4,792,474 | 12/1988 | Murakami et al. | 428/64 |
| 4,882,718 | 11/1989 | Kryder et al. | 369/13 |
| 4,888,750 | 12/1989 | Kryder et al. | 369/13 |
| 5,089,358 | 2/1992 | Taki et al. | 428/694 |

FOREIGN PATENT DOCUMENTS

| 57-60544 | 4/1982 | Japan . |
| 60544 | 4/1982 | Japan . |
| 2152041 | 6/1990 | Japan . |
| 447910 | 8/1992 | Japan . |

OTHER PUBLICATIONS

*J. Appl. Phys.*, vol. 63, No. 8, Apr. 15, 1988, pp. 3844–3846.
*IEEE Transactions on Magnetics*, vol. 23, No. 1, Jan. 1987, pp. 171–173.
*Appl. Phys. Lett.*, vol. 49, No. 8, Aug. 25, 1986, pp. 473–474.
*IEEE Transactions on Magnetics*, vol. 25, No. 5, Sep. 1989, pp. 3530–3532.
*J. Appl. Phys.*, vol. 69, No. 8, Apr. 15, 1991, p. 4967.

*Primary Examiner*—Stevan A. Resan
*Attorney, Agent, or Firm*—Sughrue, Mion, Zinn Macpeak & Seas

[57] ABSTRACT

The reproduction characteristics, particularly the C/N ratio of a reproduced signal of an optical recording medium are deteriorated by an unevenness or deformation of an optical recording layer due to a convex or concave configuration of underlying guide means that are formed on the surface of the substrate. This deterioration can be prevented by disposing a leveling layer under the recording layer, but the leveling layer lowers the efficiency of the servo tracking. This lowering of servo tracking efficiency is prevented by insertion of a dielectric layer between the leveling layer and the guides.

15 Claims, 6 Drawing Sheets

MAGNETO-OPTICAL RECORDING MEDIUM COMPRISING A SPECIFIED SUBSTRATE

This is a Continuation of application Ser. No. 07/986,078 filed Dec. 4, 1992 now abandoned.

BACKGROUND OF THE INVENTION

1. Field of the Invention

The present invention relates to a substrate for an optical recording medium, particularly suitable for a magneto-optical recording medium capable of direct overwrite by modification of power level and/or pulse width of the recording optical pulse, and also relates to such a magneto-optical recording medium using said substrate.

2. Description of the Related Art

Optical discs have been intensively investigated, developed and commercialized as high density and capacity information storage media. The commercialized optical discs have, adjacent to data areas, a guide in the form of a convex or concave portion on the surface of the substrate for servo tracking by an optical beam during recording, reproduction, erasing, etc., of information. The typical guide is a groove formed on the surface of the substrate in the form of spiral or concentric circles. The control of the tracking servo is conducted by a light reflected from the guide.

It is however known that the quality of signal is degraded by the guides existing in the vicinity of the data areas. The convex or concave guides reflect to the recording layer which causes a deformation of bit configuration lowering the C/N ratio (carrier to noise ratio), etc.

Some solutions have been proposed to solve the above problem. For example, U.S. Pat. No. 5,089,358, issued on Feb. 18, 1992 for Taki et al, discloses a flat layer formed on a base plate to provide a flat surface on which a recording layer is formed so that the signal reproduced from the recording layer is not deteriorated. Taki et al form the guides by patterning a metal reflecting layer deposited on a glass base plate, followed by making the flat layer on the guides. This process requires complex steps such as photolithography and etching and is not adequate for mass production due to low yield and high cost, etc.

JP-A-57-60544, published on Apr. 12, 1982, discloses a leveling resin layer formed on a resin substrate having convex or concave portions, as a tracking servo guide on the surface thereof. In JP-A-57-60544, since both the planalizing layer and the substrate are made of a resin, the light reflection from the tracking servo guide is disadvantageously low due to a small difference of the refractive index thereof so that the tracking servo is not efficient.

JP-A-2-152041, published on Jun. 12, 1990, discloses a leveling layer of silicon nitride on a substrate by sputtering or evaporating silicon nitride onto a substrate while milling the surface of the deposited silicon nitride layer. This sputtering or evaporation while milling is complex and does not provide a planalizing layer having a desired planer top surface.

JP-B2-4-47910, published on Aug. 5, 1992, discloses a thin film coating on a substrate having convex or concave portions as tracking servo guides, in which the thin film coating covers the sharp angle edges of the convex or concave portions and provides a relatively flat or smooth top surface by which a recording layer to be formed thereon would not be damaged. In JP-B2-4-47910, if the thin film coating is an organic resin layer, a sufficient difference in the refractive index between the thin film coating and the substrate cannot be obtained, and if the thin film coating is an inorganic layer, the top surface of the thin film coating cannot be made geometrically planar, causing the S/N ratio to be lowered due to still existing geometrical convex or concave portions.

The object of the instant invention is to solve the above problems, to provide a substrate for an optical recording medium by which a reliably high tracking signal is obtained from the guides for a tracking servo and an enhanced quality of reproduced signal can be obtained due to a recording layer being formed on a geometrically planar surface of the substrate, and which can be produced at a high yield and a low cost, and to provide a magneto-optical recording medium using such a substrate.

SUMMARY OF THE INVENTION

To attain the above and other objects of the invention, the present invention provides a substrate for an optical recording medium, comprising a base having guide means in the form of convex or concave portions for servo tracking with an optical beam, the base being made of an organic resin material in at least a portion thereof where the guide means is formed; a dielectric layer on the base at least in an area where the guide means is formed; and a planalizing layer on the dielectric layer and the base for burying the convex or concave portion of the guide means and making a top surface of the planalizing layer flat; wherein the dielectric layer has a refractive index higher than those of the organic resin material forming the guide means and the leveling layer.

The present invention also provides a magneto-optical recording medium comprising A) the substrate as described above and B) a magneto-optical recording layer over the substrate, the magneto-optical recording layer being capable of being directly overwritten by modification of a power level and/or pulse duration when recording an optical pulse.

BRIEF DESCRIPTION OF THE INVENTION

FIG. 1 schematically illustrates a substrate for an optical disc of the present invention.

DETAILED DESCRIPTION OF THE INVENTION

In the present invention, a light reflected from guides for servo tracking is utilized to control the tracking servo. It is necessary to obtain a sufficient intensity of the reflected light from the guides to attain a stable tracking servo capability. Specifically, at least 10% of the reflection of a tracking servo light beam from the guides is preferred. To attain this condition, it is sufficient that a dielectric layer of a material having a refractive index higher than that of the base in which the guides are formed and that of the leveling layer and having a high transparency is disposed at least on the guides. Since the typical resin materials of the base including the guide portions has a refractive index of 1.4 to 1.6, it is preferred that the dielectric layer has a refractive index of not less than 1.6 for the wavelength of the light beam for servo tracking, to obtain a sufficient intensity of reflected light.

Materials satisfying the above conditions include AlN, ZnS, $Si_3N_4$, AlSiN, SiO, $Zr_2O_3$, $In_2O_3$, $SnO_2$, $Ta_2O_5$, AlON, SiON, ZrON, InON, SnON and TaON, and mixtures thereof.

The percent reflection of light for servo tracking is more preferably not less than 15% to obtain a stabler servo tracking capability and a higher reproduction signal intensity. To attain this, the refractive index of the dielectric material is preferably not less than 1.8 for the wavelength of light for servo tracking. In this respect, inorganic oxides and/or nitrides such as AlSiN, $Si_3N_4$, $Zr_2O_3$, $Ta_2O_5$, ZrON and TaON are preferable and from the viewpoint of durability AlSiN is particularly preferable.

When n layers are stacked, a layer $I_m$ having a refractive index of $N_m^{\pm}$ and a thickness of $h_m$ is sandwiched by a layer $I_{m-1}$ having a refractive index of $N_{m-1}^{\pm}$ and a layer $I_{m+1}$ having a refractive index of $N_{m+1}^{\pm}$, and a light having a wavelength of $\lambda$ is incident from the layer $I_{m+1}$ side, the amplitude reflection $R_{m,m+1}^{\pm}$ is expressed by the following formula:

$$R_{m,m\pm1}^{\pm} = \frac{\tilde{r}_{m-1,m}^{\pm} + \tilde{r}_{m,m+1}^{\pm} \exp(-2j\phi_m^{\pm})}{1 + \tilde{r}_{m-1,m}^{\pm} \tilde{r}_{m,m+1}^{\pm} \exp(-2j\phi_m^{\pm})} \quad (1)$$

$$\text{where } \tilde{r}_{m-1,m}^{\pm} = \frac{n_{m-1}^{\pm} - n_m^{\pm}}{n_{m-1}^{\pm} + n_m^{\pm}} \quad (2)$$

$$\phi_m^{\pm} = \frac{2\pi n_m^{\pm} h_m}{\lambda} \quad (3)$$

and j denotes the complex number.

The total reflection can be obtained by adding all of the reflections from the interfaces between adjacent layers.

Figure 1:
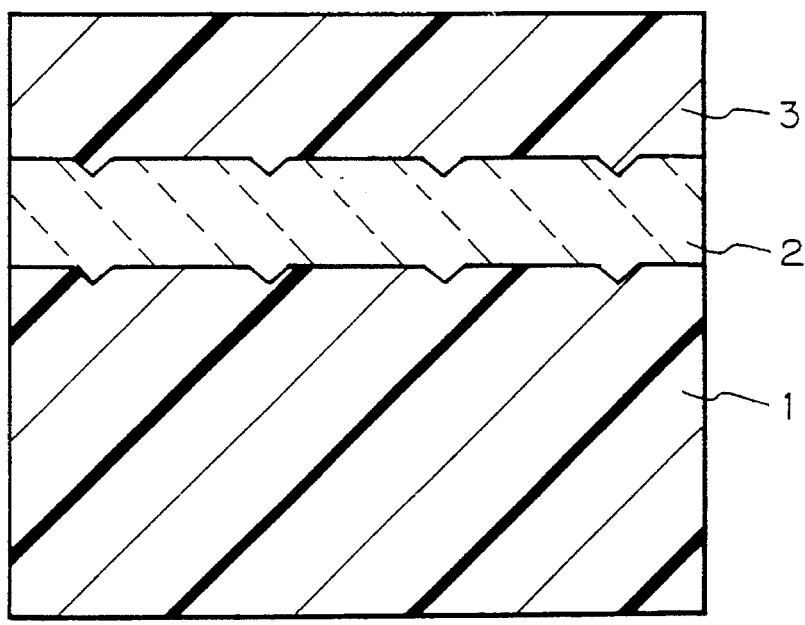
Figure 2:
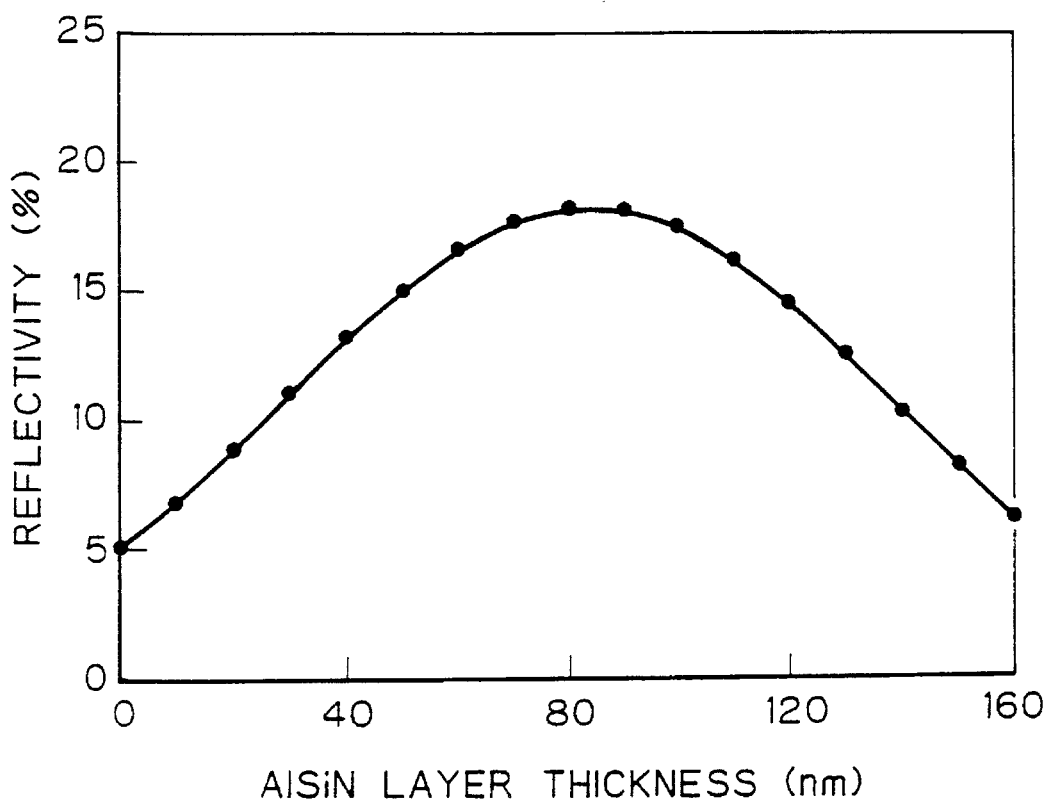
FIG. 2 shows the dependency of the reflectivity on the AlSiN layer thickness 2 in the structure as shown in FIG. 1.

For example, in the three-layer construction as shown in FIG. 1, when the base 1 is polycarbonate, having a refractive index of 1.58, the dielectric layer 2 is AlSiN having a refractive index of 2.05, the leveling layer 3 is a resin having a refractive index of 1.50, and the thickness of the dielectric layer is varied, the total reflection from the three-layer construction is shown in FIG. 2.

A higher reflection is periodically obtained when the thickness of the dielectric layer is varied. Any thickness of the dielectric layer providing a higher reflection may be advantageously used, but a thin thickness is preferable from the viewpoint of productivity.

Such a preferable thickness of the dielectric layer depends on the refractive index of the dielectric layer. When the dielectric layer is an inorganic nitride, oxide or the like, the refractive index thereof is in a range of 1.6 to 2.3 and the thickness of the dielectric layer is preferably in a range of 20 nm to 160 nm.

When the degree of the nitrization and/or oxidation of the nitride and/or oxide dielectric layer is lowered, the recording and reproduction characteristics are affected but the refractive index is increased so that the thickness of the dielectric layer can be made thinner and the productivity is improved.

The dielectric layer may be a single layer or a multi-layer of different materials.

The dielectric layer can be formed by any process including PVD such as evaporation, sputtering and CVD or the like. It is preferred for optical discs that the dielectric layer is firmly adhered to the substrate to prevent peeling of the dielectric layer during high temperature and high humidity durability tests and the sputtering process is preferred in this respect.

The dielectric layer is formed on at least the guides but is preferably formed on the entire surface of the base including the guides since it is easy to make.

When such a dielectric layer having a thickness of around 100 nm is deposited on the guides or base, the top surface of the dielectric layer retains the configuration of the guides and cannot be geometrically planar. Since the light reflection depends on the thickness of the dielectric layer, the thickness of the dielectric layer is generally selected so that the light reflection from the data areas, i.e., areas without guides of convex or concave portions, becomes maximum. It is preferred that the dielectric layer has a uniform thickness along the top surface of the base including the guide portions so that the light reflection from the guides is also almost maximum. It is preferred that the difference of the thickness of the dielectric layer along the layer is less than 10%.

In the instant invention, the convex or concave portions of the top surface of the dielectric layer due to the guides are filled in, for example, by coating a material having a low viscosity to make the top surface geometrically planar on which a recording layer is to be formed so that the configuration of the recording bits is not affected due to the presence of the guides and a high quality reproduction signal can be obtained due to perfect bit configuration. The difference of the level of the top surface of the leveling layer is preferably less than a few tens nanometers.

The thickness of the leveling layer is preferably in a range of 50 nm to 500 nm on the guides. Since the guides have a depth or height of more than 40 nm, the leveling layer should preferably have a thickness of 50 nm or more to cover the guides. The thickness of the leveling layer is preferably 500 nm or less when productivity is considered.

The material to be used for the leveling layer is not particularly limited as long as it can bury the convex or concave portions of the guides and provide a planar top surface, but is preferably a resin due to easy formation of the layer.

Such resins include any resins which can be used for optical discs, for example, ultra-violet ray curable resins, electron beam curable resins, epoxy resins, silicate resins, urethane resins, polyester resins, thermoplastic resins, etc.

It is preferred, however, that the resins can be dissolved in general organic solvents since the resins are to be coated at a lowered viscosity prepared by diluting with a solvent.

In the production of optical discs, UV-curable resins and electron beam curable resins are often used because of their high productivity and excellent protection effect or the like. The UV-curable resins are most often used because equipment therefor is simpler than that of the electron beam curable resin. Such UV-curable resins are commercially available as compositions comprising a compound called acrylate of oligomer, having a relatively high molecular weight and obtained by acrylating or metacrylating a compound or oligomer having a functional group such as hydroxyl or epoxy, for example, acrylate of a bisphenol A-based epoxy compound or oligomer, a compound having one functional group, e.g., (meth)acryloyloxy, or two to six functional groups, e.g., (meth)acryloyloxy, and an initiator.

For example, SD-17, SD-301, etc., produced by Dainippon Ink and Chemicals, Inc. and UR-4502 produced by Mitsubishi Rayon are commercially available. Also, MH-71 produced by Mitsubishi Rayon, for example, is commercially available as an electron beam curable resin.

Epoxy resins can be any ones that can be used for optical discs, typically ones derived from bisphenol. Nevertheless, since transparency is required for optical discs, the curing agent should be carefully selected. From the viewpoints of curing rate and transparency, pentaerythritol-derived diamine and the like are preferably used and, for example, Epomate N-002 produced by Yuka Shell Epoxy can be mentioned as a preferred curing agent.

Silicate resins are also any ones that can be used for optical discs, including thermoplastic types such as alkylsiloxane, and UV-curable types such as acryl silicone compound. For example, glass resin GR-650 produced by Showa Denko and KP-f5 and KNS-5300 produced by Shin-Etsu Chemical Co. Ltd. can be used.

Thermoplastic resins that can be used are those which do not affect the recording layer, are soluble in an adequate solvent, particularly an organic solvent and provide a uniform transparent layer. For example, acrylates resin such as polymethylmethacrylate and polyethylmethacrylate, acrylonitrile resins such as polyacrylonitrile and polymethacrylonitrile, fluorine-based resins such as vinyl fluoride-hexafluoropropylene copolymer, vinyl resins such as vinyl chloride and vinyl acetate, polyvinyl-alcohol resins, polyvinylbutylal resins, polyester resins, polyurethane resins, etc., and mixtures and copolymers thereof can be preferably used.

The planalizing layer can be formed by spin coating, screen printing, roll coating, spray coating, dipping, sputtering, etc. When the planalizing layer is a cured resin layer, the resin layer is preferably applied by coating a resin or a diluted resin solution from the viewpoint of workability. Further, spin coating is the most preferable considering the productivity, cost, etc.

When the planalizing layer is applied by a spin coating method, the viscosity of the resin to be applied must be low, e.g., by diluting a resin material with a solvent. Preferred viscosity of the resin solution to be applied by spin coating is not more than 50 cP at 20° C. to obtain a layer thickness of 200 to 500 nm and not more than 30 cP at 20° C. for a layer thickness of 50 nm to 200 nm.

The solvent for dilution may be any ones that for an organic resin base that do not cause chemical damage to the base and can be almost volatilized during the curing of the resin. Preferred solvents include isopropylalcohol, butylalcohol, ethylalcohol, etc., from the viewpoint of handling poisonous materials.

The guides formed on the top surface of the base are typically grooves, but are not limited thereto. The grooves preferably have a depth of not less than 40 nm to obtain a stable servo tracking capability and more preferably not less than 70 nm to obtain a more stable servo tracking capability. The configuration of the grooves as the guides is not particularly limited but a V-groove is preferred to make the reflections from the guides and the dielectric layer overlying the guides efficient.

The material of the base is preferably an organic resin at least at a portion where the guides are formed. Both of a base entirely made of a single organic resin and a base with a cured resin layer prepared by the 2P(photo-polymer) method to provide guides on the surface of the base can be used as the base of the present invention.

The organic resins used for the base include polycarbonate resins, acryl resins, epoxy resins, 2-methyl pentene resin, polyolefin resins, or copolymers thereof. Among others, polycarbonate resins are preferred from the viewpoints of mechanical strength, durability, thermal resistance, transparency and cost. It is preferred to prepare the entire base by a polycarbonate resin from the viewpoint of productivity.

The guides used at the present for servo tracking are V-grooves in the form of a concentric circle or spiral at a pitch of about 1.6 μm with a groove width of about 0.6 μm and a group depth of typically 70 nm. Nevertheless, the configuration of the guides and track pitch are not limited to the above in the present invention.

The recording layer to be formed on the substrate prepared as described above is not particularly limited. Magneto-optical recording layers of amorphous rare earth element-transition metal alloys, inorganic or organic phase-transition type recording layers, write once-recording type recording layers, or any other optical recording layers can be used.

Specifically, the optical recording layer can be sandwiched by transparent dielectric layers, a reflecting metal layer can be inserted on a side of the recording layer opposite to the light incident side, and/or an inorganic and/or organic protecting layer can be provided over the recording layer.

Further, although a magneto-optical recording layer is sandwiched by transparent dielectric layers to enhance the Kerr effect and the thus sandwiched structure is to be formed on the planalizing layer of the substrate, the dielectric layer between the recording layer and the planalizing layer may be eliminated by utilizing the planalizing layer as the enhancement layer. In this case, the thickness of the planalizing layer is preferably 200 nm to 300 nm to obtain a maximum enhancement effect. The material of the planalizing layer is not particularly limited and may be, for example, UV-curable resin, electron beam curable resin, epoxy resin, silicate resin, urethane resin, polyester resin, thermoplastic resins, or the like.

The substrate for an optical recording medium of the present invention is particularly advantageously applicable to a magneto-optical recording medium which can be overwritten only by modification of power level and/or pulse width of an optical pulse.

The drawback of the magneto-optical recording media in comparison with floppy discs, hard discs, etc., is the fact that direct overwrite is difficult. Here, the direct overwrite means writing information while erasing already written information.

Various direct overwrite methods have been proposed for magneto-optical recording media. Among others, a method disclosed in U.S. Pat. No. 4,888,750; J. Appl. Phys. Vol. 63 No. 8 (1988) 3844; IEEE TRANS. Magn. Vol. 23 No. 1 (1987) 171; Appl. Phys. Lett. Vol. 49 No. 8 (1986) 473; IEEE TRANS. Magn. Vol. 25 No. 5 (1989) 3530; J. Appl. Phys. Vol. 69 No. 8 (1991) 4967; and others has attracted attention because it does not require modification of the conventional magneto-optical recording apparatus in their optical system, magneto and so on. The proposed method uses a magneto-optical recording layer in which the direction of the net remnant magnetization can be self-inverted at a portion of magnetic domain wall region when heated by a laser beam, and carries out the direct overwrite by modifying power level and/or pulse width of an optical pulse without changing the direction and intensity of the bias magnetic field. The descriptions of the above publications are incorporated by reference.

The present inventors carried out experiments to confirm the direct overwrite as proposed above. The medium used comprises a polycarbonate substrate having a diameter of 130 mm and a thickness of 1.2 mm and having 1.6 μm pitch spinal grooves, a magneto-optical layer of a rare earth-transition metal amorphous alloy $(Gd_{25}Tb_{75})_{28}(Fe_{80}CO_{20})_{72}$, 150 nm thick, as the above self-invertible magneto-optical recording layer on the substrate, and transparent dielectric layers of AlSiN 80 nm thick sandwiching the magneto-optical recording layer.

Figure 3A:
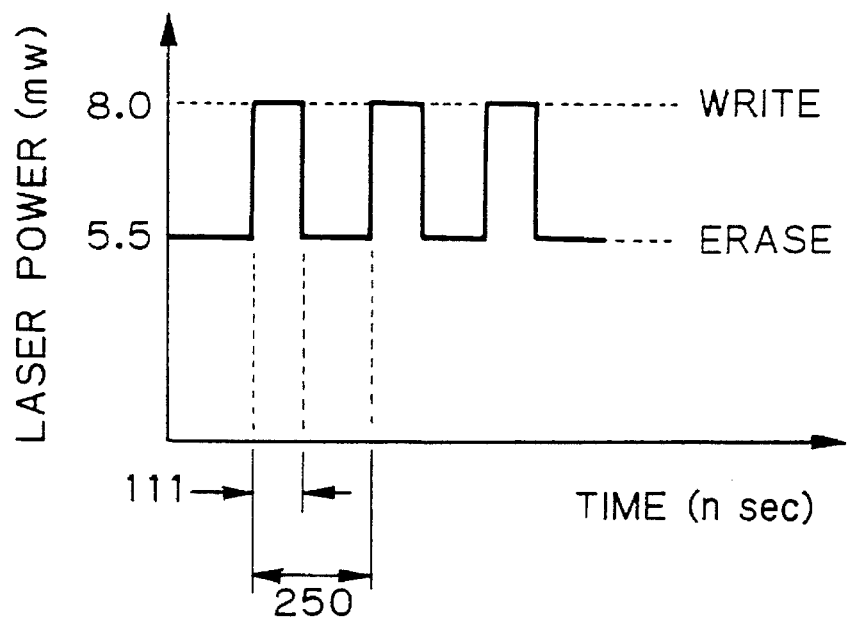
FIGS. 3A and 3B show the pulses used to write and overwrite in an embodiment of the present invention.

The overwrite operation was conducted on the above medium. The rotation speed of the medium was a linear speed of 11.5 m/sec at a point of a radius of 30 mm. The writing and erasing were conducted by 4 MHz pulse signals as shown in FIG. 3A under an external bias magnetic field of 350 Oe in the direction of the bit recording. The power level of the laser having a wavelength of 830 nm was 15.0 mW for writing and 9.0 mW for erasing. The reading was conducted by a continuous light, DC laser of 1.0 mW. Thus, the C/N of the reproduced signal was evaluated to be about 37 dB.

Figure 3B:
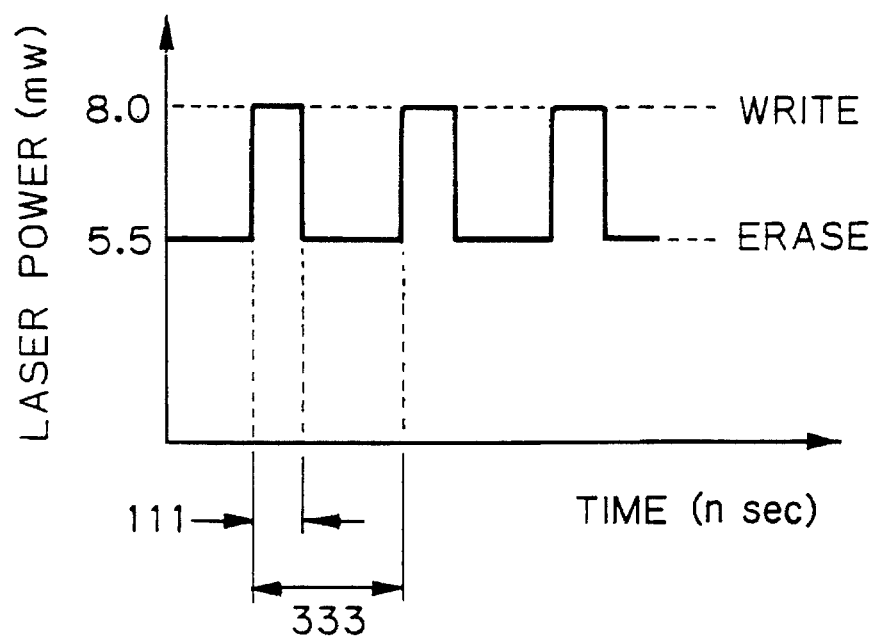

Next, the direct overwrite was conducted on the above medium on the same track as evaluated above under an external bias magnetic field of 350 Oe using 3 MHz pulse-signals as shown in FIG. 3B. The reproduced signals were measured by a continuous light, DC laser, of 1.0 mW to find that the initially recorded 4 MHz signals were completely erased and only 3 MHz signals were recorded. The C/N ratio of the reproduction signal was then about 37 dB. Thus, the overwrite operation by the above laser pulse modification was confirmed. Nevertheless, the characteristics of the reproduced signal, i.e., the C/N ratio, was so low, i.e., about 37 dB, that it necessitated a remarkable improvement for practical use.

As described above, in conventional optical discs, the C/N ratio of the reproduced signals is lowered by the reflection of the configuration of the guides to the recording layer. The magneto-optical recording medium of the direct overwrite type as described above encounters the same problem more severely. In the considered overwrite method, the erasing of information occurs during the course of the temperature profile formed by scanning of a laser beam having an erase power level approaching the already written recording bit. Specifically, prior to when the maximum temperature portion of the temperature profile enters into the written recording bit, a portion of the magnetic domain wall region reaches a certain temperature lower than said maximum temperature and the net remnant magnetization then self-inverted to result in the erasure. Accordingly, if the recording layer has a convex or concave portion due to the guides, the above-mentioned temperature profile and the self-inversion of net remnant magnetization are affected or varied and the erasing step may be disturbed or hindered.

In accordance with the present invention, the above problem of a magneto-optical recording medium driven by direct overwriting through only modification of power and width of an optical pulse can be solved by providing a planar top surface of the substrate on which the recording layer is formed while obtaining a desired level of the reflection of an optical beam by insertion of a dielectric layer and thus the C/N ratio of the reproduced signals can be remarkably improved.

Thus, in accordance with the present invention, there is also provided a magneto-optical recording medium comprising A) a substrate comprising i) a base having guide means in the form of convex or concave portions for servo tracking with an optical beam, the base being made of an organic resin material in at least a portion thereof where the guide means is formed, ii) a dielectric layer on the base at least in an area where the guide means is formed, and iii) a leveling layer on the dielectric layer and the base for burying the convex or concave portion of the guide means and making a top surface of the planalizing layer flat, wherein the dielectric layer has a refractive index higher than that of the organic resin material forming the guide means and the planalizing layer, and B) a magneto-optical recording layer over the substrate, the magneto-optical recording layer being capable of being directly overwrite by modification of power level and/or pulse duration of a recording optical pulse.

The recording layer used in the above magneto-optical recording medium of the present invention may be any perpendicularly magnetizable layers in which the direction of the net remnant magnetization can be self-inverted at least a portion of the magnetic domain wall region by heating with an optical beam without changing the direction and intensity of the bias magnetization, if present. Such layers include, for example, amorphous alloys of rare earth element and transition metal as main components such as TbFe, GdFe, DyFe, TbFeCo, GdFeCo, DyFeCo, DyTbFeCo, GdTbFeCo, GdDyFeCo, GdDyTbFeCo, NdDyFeCo, NdDyTbFeCo, NdFe, PrFe, CeFe, etc., garnet layers, multilayers such as Co/Pt and Co/Pd, CoPt alloy layer, CoPd alloy layer, and so on.

The above recording layer may contain an additional element up to about 10 atom % as long as the perpendicular magnetization anisotropy does not disappear. For example, one or more of rare earth elements, Fe, Co and Ni, and other elements such as Ti, Zr, Hf, V, Nb, Ta, Cr, Mo, W, Tc, Re, Ru, Os, Ir, Si, Ge, Bi, Pd, Au, Ag, Cu, Pt, etc. may be contained. Particularly, Ti, Zr, Hf, Ta, Cr and Re may be preferably added to prevent corrosion of the recording layer by oxidation.

It is preferred that the compensation temperature $T_{comp}$ of the recording layer is in a range of 50° C. to 250° C., more preferably 80° C. to 160° C. and the Curie temperature of the recording layer is in a range of 100° C. to 350° C., more preferably 200° C. to 250° C., to obtain a higher C/N ratio of the reproduction signal.

The thickness of the recording layer is preferably in a range of 10 nm to 200 nm. When the thickness of the recording layer is less than 10 nm, the layer may have problems in the layer structure such as continuity and uniformity of the layer. When the thickness of the layer is higher than 200 nm, the heat capacity of the layer becomes so large that a higher optical beam power is required for writing and erasing.

When a transparent dielectric layer is disposed between the substrate and the recording layer to enhance to Kerr effect, the dielectric layer is preferably made of a material having a refractive index of not less than 1.6, more preferably not less than 1.8.

Such a transparent dielectric layer may be AlN, ZnS, $Si_3N_4$, AlSiN, SiO, $Zr_2O_3$, $In_2O_3$, $SnO_2$, $Ta_2O_5$, AlON, SiON, ZrON, InON, SnON, TaON or a mixture thereof. Particularly, $Si_3N_4$, AlSiN, ZnS, $Zr_2O_3$, $Ta_2O_5$, ZrON and TaON are preferred since these materials have a refractive index of not less than 1.8.

The transparent dielectric layer may be not only a single layer of a single material but also a multilayer of a plurality materials.

It is also preferred that the recording layer has a thickness of 15 nm to 100 nm, more preferably not more than 60 nm, particularly not more than 40 nm and a reflecting metal layer is disposed on a side of the recording layer opposite to the substrate side, to increase the C/N ratio of reproduction signal.

The reflecting metal layer preferably has a higher reflection of an optical beam of a drive head than the reflection by the recording layer, to increase the S/N ratio. Specifically, when the complex index of refraction of a material is expressed as (n+ik), it is preferred to select a material having a refractive index n and an extinction coefficient k of $n \leq 3.5$ and $k \geq 3.5$, more preferably $n \leq 2.5$ and $4.5 \leq k \leq 8.5$ for the wavelength of the optical beam used. The magneto-optical recording medium using a reflecting metal layer satisfying the above conditions has a higher light reflection to enhance the Kerr effect and thus improve the C/N ratio.

If the reflecting metal layer has a high thermal conduction coefficient during recording with heat by an optical beam, the heat diffusion or conduction through the reflecting metal layer is so high that a high power of the optical beam is required. Thus, in order to make the recording possible with a commonly used semiconductor laser having a power of not more than 10 mW, the material of the reflecting metal layer preferably has a thermal conduction coefficient of not more than 100 W/(m·k), more preferably not more than 80 W/(m·k), further preferably not more than 50 W/(m·k).

The materials satisfying the above conditions include Al or Ag alloyed with Au, i.e., AlAu alloy or AgAu alloy. If the content of Au is less than 0.5 atom %, the reduction of the thermal conduction coefficient by the alloying is less and if the content is more than 20 atom %, the light reflection by the layer is lowered. Thus, the content of Au in the above alloys is preferably in a range of 0.5 to 20 atom %.

To suppress lowering of the light reflection in comparison with the metal Ag layer to not more than 2% and prevent lowering of the C/N ratio, the content of Au in the AlAu or AgAu alloy is preferably in a range of 0.5 to 15 atom %, more preferably 0.5 to 10 atom %.

The above low content of Au is also advantageous in reduction of costs of the target and medium.

To allow the minimum content of Au, one or more of certain elements such as Ti, Zr, Hf, V, Nb, Ta, Cr, Mo, W, Tc, Re, Ru, Os, Ir, etc. may be additionally added. The content of these additional elements should be not more than 5 atom % to prevent lowering of the light reflection by the reflecting metal layer and lowering of the C/N ratio. If the content of the additional elements is not more than 5.0 atom %, the lowering of the reflection of a semiconductor laser beam having a wavelength of 830 nm used in magneto-optical recording and reading units cannot be more than 2%. If the content of the additional element is less than 0.3 atom %, the increase of the thermal conduction efficient due to the save or reduction of the Au content cannot be complemented. Thus, the content of the additional elements should be in a range of 0.3 to 5.0 atom %. By addition of an additional element in an amount of 0.3 to 5.0 atom % in combination of the content of Au of 0.5 to 10 atom %, the lowering of the light reflection by the reflecting layer in comparison with that by an Al or Ag metal layer can be suppressed to less than 2%, the cost of Au can be reduced, and the thermal conduction coefficient of the reflecting layer can be set in a range of 20 to 100 W/(m·k).

Among the above additional elements, Ti, Zr, Nb, Ta, Cr and Re are preferable since they can improve the durability of the reflecting metal layer. The reflecting metal layer generally has a thickness of 10 to 50 nm, and 30 to 200 nm is preferable and 40 to 100 nm is more preferable to prevent the lowering of the C/N ratio due to lowering of the reflection and allow the recording by a laser power of 10 mW.

With the Au content and/or additional element content as described above, the thermal conduction coefficient of the reflecting layer cannot be more than 100 W/(m·k) and the recording can be made by a laser power of 10 mW.

The location of the reflecting metal layer is not particularly limited as long as it is disposed on a side of the recording layer opposite to the light beam incident side. Namely, the reflecting metal layer may be disposed directly on the magneto-optical recording layer, or a transparent dielectric layer may be inserted between the reflecting metal layer and the magneto-optical recording layer, or an inorganic and/or organic protection layer, for example, a transparent dielectric layer, may be further provided over the reflecting metal layer formed on the recording layer.

The inorganic layers of the transparent dielectric layer, the recording layer and the reflecting metal layer can be formed by any known process including PVD such as evaporation and sputtering, CVD, and others. Nevertheless, since the magneto-optical recording layer should preferably be firmly bonded to the underlying layer, e.g., a polymer substrate, to prevent peeling off in a high temperature and high humidity atmosphere.

The organic protection layer may be a photo-curable and/or heat-curable resin or a thermoplastic resin, or the like and can be applied by coating, etc., as in the case of the planalizing layer. The protection layer on a side of the recording layer opposite to the substrate side preferably also covers the end sides of the recording layer.

The wave configuration of the optical beam applied for writing and erasing, i.e., overwriting is not limited to those shown in FIGS. 3A and 3B. For example, the recording and erasing pulses can be changed to a series of narrower or closer pulses, or a combination of such a series of narrower or closer pulses and a continuous pulse as shown in FIGS. 3A and 3B.

The power of an optical beam should be selected depending on the recording sensitivity, i.e., the Curie temperature of the recording layer, and the layer structure of the medium.

Here, the disclosures contained in the publications mentioned before as disclosing the overwrite process by only modification of power and pulse width of an optical beam are incorporated herewith by reference.

In the magneto-optical recording medium of the present invention, excellent overwrite characteristics, particularly a remarkably improved C/N ratio, can be obtained by operation of overwrite with only modification of power and/or pulse width of an optical beam.

It should be noted that although U.S. Pat. No. 4,888,750 discloses that the direct overwrite is observed without using external magnetic bias aiding the recording process, the present inventors found that the C/N ratio can be improved by providing a certain magnetic bias during the overwrite operation by modification of power and/or width of an optical beam. In the latter case, the direction and intensity of the magnetic bias are not changed during the overwrite operation. It is preferred that the substrate or the top surface thereof has a thermal conduction coefficient of not more than 0.5 W/(m·k), the content X of the rare earth element in atom % of the magneto-optical recording layer of a rare earth-transition metal amorphous alloy is in a range of 20 atom % to 28 atom %, and the applied magnetic bias Hex in Oe is not less than $17 \times (X-24)^2 + 100$ and not more than $30 \times (X-24)^2 + 400$.

EXAMPLES

Example 1 and Comparative Examples 1 and 2

Figure 4:
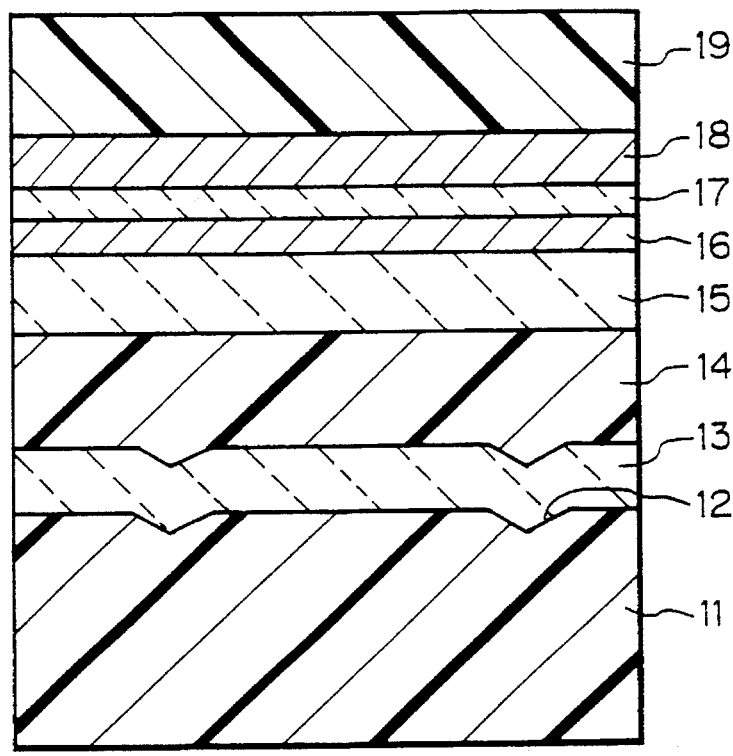
FIG. 4 is a cross-sectional view of a magneto-optical recording medium of Example 1.
Figure 5:
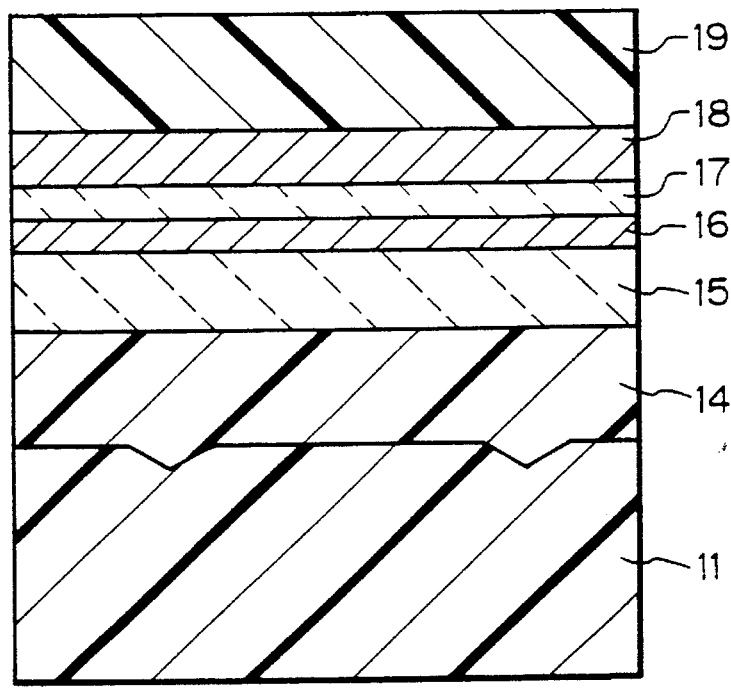
FIGS. 5 and 6 are cross sectional views of magneto-optical recording media of Comparative Examples 1 and 2, respectively.
Figure 6:
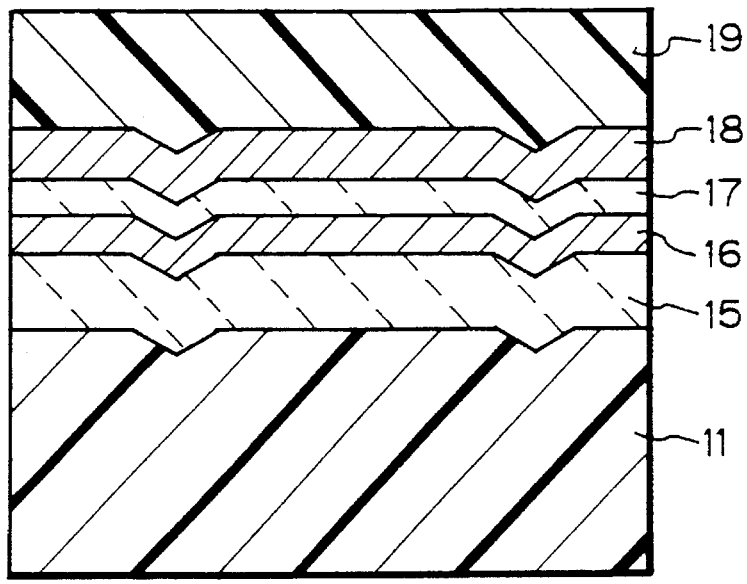

Magneto-optical recording media having the constructions as shown in FIGS. 4 to 6 were manufactured and evaluated. In these figures, 11 denotes a base having guide grooves 12 on the surface thereof, 13 denotes a dielectric layer on the base 11 and the guide grooves 12, 14 a leveling layer, 15 a dielectric layer underlying a recording layer 16, 16 denotes a recording layer, 17 a dielectric layer overlying the recording layer 16, 18 a reflecting metal layer and 19 an organic protection layer.

A base 11 of a polycarbonate (PC) with guides 12 for servo tracking on the surface thereof was prepared. The base 11 has a diameters of 130 mm and a thickness of 1.2 mm and the formed guides 12 are grooves in a spiral form having a pitch of 1.6 µm and a depth of 70 nm and a width of 0.6 µm.

With this base 11, three types of media were manufactured by providing a dielectric layer 13 on the base 11 and a leveling layer 14 on the dielectric layer 13 (Example 1; FIG. 4), by providing only a leveling layer 14 on the base 11 without a dielectric layer 13 (Comparative Example 1; FIG. 5), and by providing a dielectric layer 15 (recording layer 16) directly on the base 11 without a dielectric layer 13 and a leveling layer 14 (Comparative Example 2; FIG. 6).

The base 11 was set in a vacuum chamber of a three target RF magnetron sputtering unit (ANELVA Corporation SPF-430H) and the chamber was evacuated to $5.0 \times 10^{-5}$ Pa. The base 11 was rotated at 15 rpm during a layer deposition. The dielectric layer 13 of AlSiN was formed on the base 11 as below. The target was a disc of sintered AlSi (50:50 in atom %) with a 100 mm diameter and 5 mm thick and the $Ar/N_2$ mixture gas flow ($N_2$ 30 vol %) was introduced into the vacuum chamber to a pressure of 0.4 Pa. The RF sputtering was conducted at a discharge power of 400 W with a RF frequency of 3.56 MHz to deposit an AlSiN layer as the dielectric layer 13 with a thickness of 80 nm.

The base 11 was then removed from the sputtering unit and mounted onto a spin coater. While rotating the base 11 at a speed of 3000 rpm, a UV-curable phenol novolak epoxy acrylate resin was coated on the base 11. The coated resin was diluted with butyl alcohol to have a viscosity at 20° C. of about 40 cP prior to the coating. The coated base was then removed from the spin coater and passed through a UV-ray irradiator to cure the resin and form a leveling layer 14 with a thickness of about 250 nm on the planar areas other than guides of the base 11 (Example 1).

On another base 11, the dielectric layer 13 was not formed and a leveling layer 14 was formed directly on the base 11 in the same manner as above Example 1. The thickness of the leveling layer 14 was about 250 nm (Comparative Example 1).

The third base 11 was not provided with any dielectric layer 13 and leveling layer 14 (Comparative Example 2).

Each of the thus prepared three types of substrates was again mounted in a vacuum chamber of the three target RF magnetron sputtering unit (ANELVA SPF-430H) and the chamber was evacuated to $5.3 \times 10^{-5}$ Pa. The substrate was rotated during the deposition.

On each of the substrates, a multilayer having the same construction was formed to make a magneto-optical recording medium, as below.

First, a dielectric layer 15 of AlSiN underlying a recording layer 16 was formed. The target was a disc of sintered AlSi (50:50) with a diameter of 100 mm and a thickness of 5 mm and a $Ar/N_2$ mixture gas flow (30 vol %) was introduced into the vacuum chamber to have a pressure of 0.4 Pa. The RF sputtering was conducted at a discharge power of 400 W with a RF frequency of 13.56 MHz to deposit the dielectric layer 15 of AlSiN, 110 nm thick.

The target was then changed to a disc of TbFeCo alloy (22:71:7 in atom %) and a deposition was conducted in a sputtering gas of pure Ar (99.999% purity) at a pressure of 0.67 Pa by a discharge power of 100 W to deposit a TbFeCo alloy layer with a Tc of 190° C., 20 nm thick, as the magneto-optical recording layer.

Then, the target was again returned to the sintered AlSi target used before and the sputtering gas was returned to the $Ar/N_2$ mixture gas ($N_2$ 30 vol %) and the sputtering was conducted under the same conditions as those for the dielectric layer 15 to deposit a transparent dielectric layer 17 of AlSiN, 25 nm thick.

Finally, a reflecting metal layer 18 was formed on the dielectric layer 17. The target was a plurality of Ti chips (5×5×mm) on an Al disc of 100 mm diameter and 5 mm thickness, the sputtering gas was pure Ar (99.999% purity), and the discharge conditions were the same as those for the recording layer 16. Thus, an AlTi (98:2) layer, 80 nm thick, was formed as the reflecting metal layer 18.

The thus prepared samples were then removed from the sputtering unit and mounted on a spin coater. While rotating the disc at a speed of 3000 rpm, a UV-curable phenol novolak epoxy acrylate resin was coated on the sample and passed through a UV ray irradiator to cure the resin and form an organic protection layer 19, of about 20 µm. The used resin was diluted with butyl alcohol to about 500 cP in viscosity before coating.

Thus, the magneto-optical recording media as shown in FIG. 4 (Example 1), FIG. 5 (Comparative Example 1) and FIG. 6 (Comparative Example 2) were obtained.

The dependency of the C/N ratio of each of the above samples on the recording power was measured. The measurement was made using a magneto-optical recording and reading unit (Pulstech Industry, DDU-1000 type) on a track of the disc at a radius of 30 mm under the conditions of a disc rotation speed of 1800 rpm, a signal frequency of 3.7 MHz (pulse duty of 33%), on external magnetic field of 300 Oe and a reading power of 1.5 mW, with the writing power being varied, and the C/N ratio was determined. When the C/N ratio became the maximum value, the writing power and that maximum C/N ratio were recorded.

As a result, stable serve tracking could be obtained in the samples of Example 1 and Comparative Example 2, but the servo tracking and the measurement of C/N ratio could not be made in the sample of Comparative Example 1. The writing powers for the maximum C/N ratio were 5.5 mW for both of Example 1 and Comparative Example 2 and the maximum C/N ratios were 51 dB for Example 1 and 48 dB for Comparative Example 2.

Example 2 and Comparative Examples 3 and 4

Figure 7:
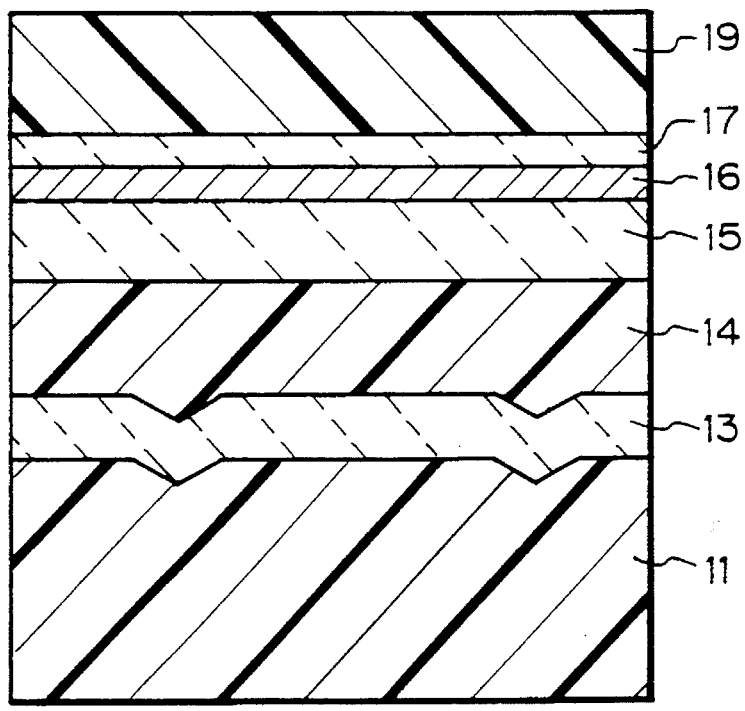
FIG. 7 is a cross-sectional view of a magneto-optical recording medium of Example 2.
Figure 8:
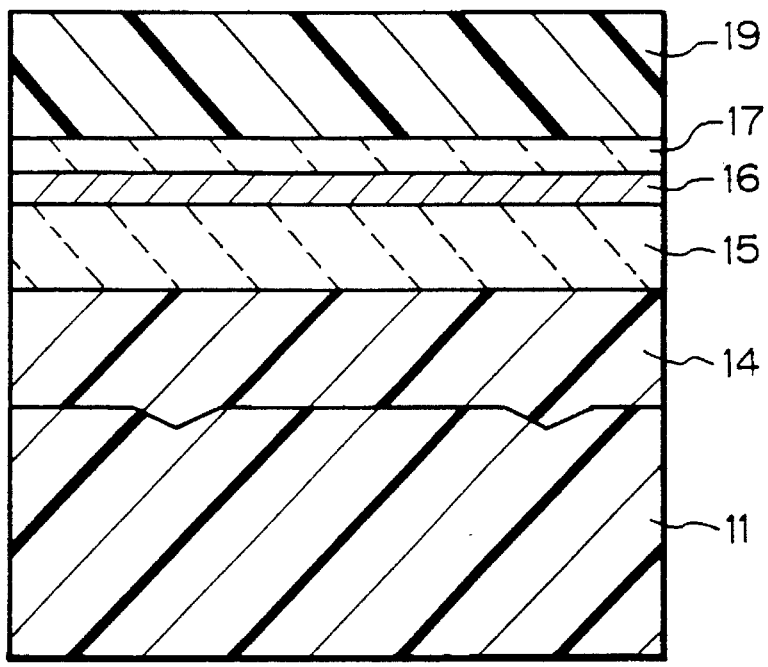
FIGS. 8 and 9 are cross-sectional views of magneto-optical recording media of Comparative Examples 3 and 4.
Figure 9:
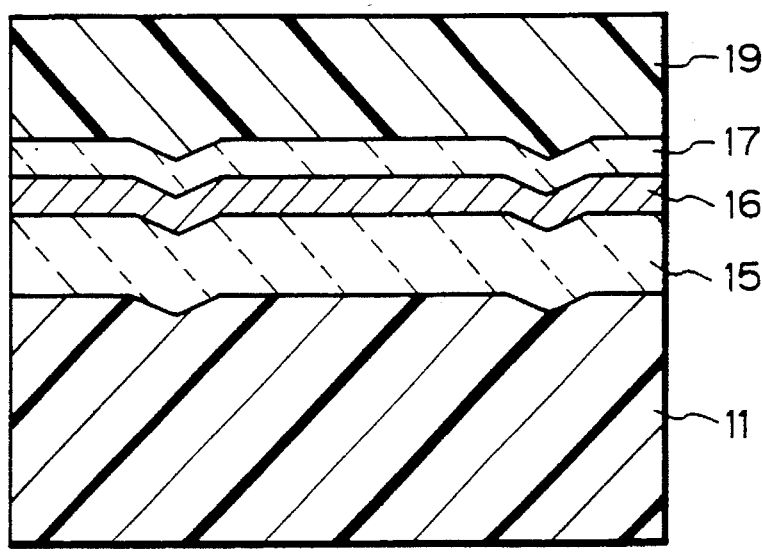

Magneto-optical recording media having the structures as shown in FIGS. 7 to 9 were manufactured in a manner similar to Example 1 and Comparative Examples 1 and 2, respectively, except for the followings.

In all samples of magneto-optical recording media of Example 2 and Comparative Examples 3 and 4, the reflecting metal layer 18 was not formed.

The magneto-optical recording layer 16 was a GdTbFeCo alloy layer. In the RF magnetron sputtering unit (ANELVA SPF-430H), the target was a disc of GdTbFeCo, the sputtering gas was pure Ar (99.999% purity), the pressure was 0.67 Pa and the discharge power of 100 W and an alloy layer of $(Gd_{25}Tb_{75})_{28}(Fe_{80}Co_{20})_{72}$ was deposited. The deposited alloy layer had a thickness of 150 nm.

The dielectric layer 17 overlying the recording layer 16 was deposited in the same manner as in Example 1 and Comparative Examples 1 and 2 except that the thickness of the deposited AlSiN layer was 80 nm, not 25 nm.

The thus prepared three samples of magneto-optical recording media were evaluated in their C/N ratio after a direct overwrite. The measurement was conducted using a magneto-optical recording and reading unit (Pulstech Industry, $DDU_{1000}$ type), by applying laser pulses having pulse wave configurations as shown in FIGS. 3A and 3B on a track of the disc at a radius of 30 mm under conditions of a disc rotation speed of 3600 rpm, a linear speed of 11.3 m/sec, and a magnetic bias of 350 Oe in the bit recording direction, to carry out overwriting, and determining the C/N ratio of the thus overwritten signals. Namely, the signal as shown in FIG. 3A was used to record bits, to which the signal as shown in FIG. 3B was applied to carry out overwriting. As a result, stable servo tracking could be obtained in the samples of Example 2 and Comparative Example 4, but the tracking servo and measurement of C/N ratio could not be carried out in the sample of Comparative Example 3. The C/N ratios were 41 dB for Example 2 and 7 dB for Comparative Example 4. Thus, a remarkable improvement in the C/N ratio was observed here in accordance with the present invention.

Example 3

Figure 10:
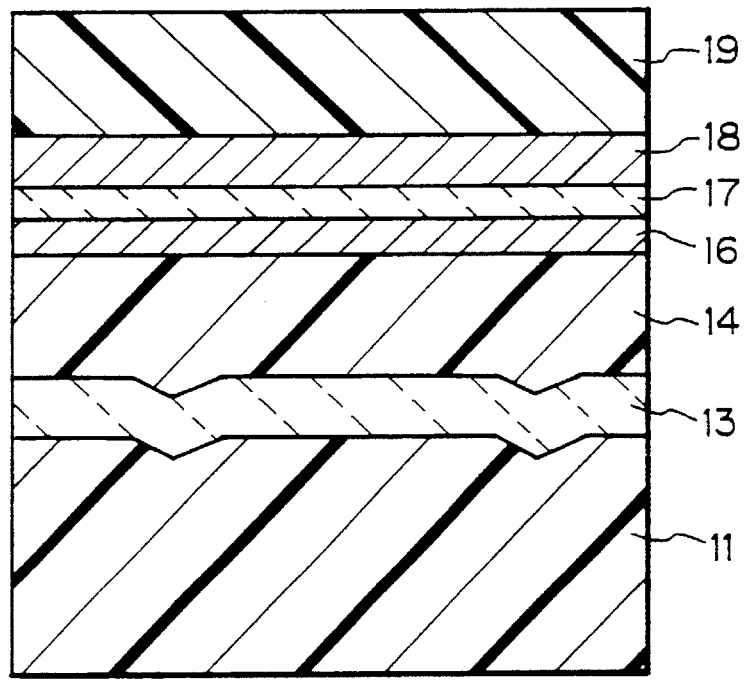
FIGS. 10 and 11 are cross-sectional views of magneto-optical recording media of Examples 3 and 4.

A magneto-optical recording medium as shown in FIG. 10 and similar to that of Example 1 was manufactured except that the dielectric layer 15 underlying the recording layer 16 was eliminated.

The dependency of the C/N ratio of the thus manufactured sample on the writing power was measured in the same manner as in Example 1.

As a result, a stable servo tracking could be obtained and the writing power when the C/N ratio became maximum was 5.5 mW and the C/N ratio at that time was 1 dB.

Example 4

Figure 11:
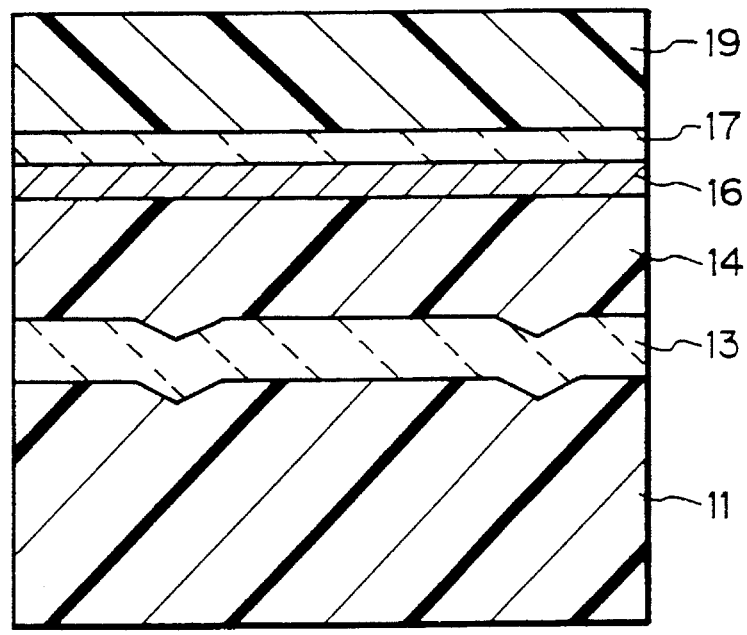

A magneto-optical recording medium as shown in FIG. 11 and similar to that of Example 2 was manufactured except that the dielectric layer 15 underlying the recording layer 16 was eliminated.

On the thus manufactured sample, writing and overwriting were carried out in the same manner as in Example 2 and the C/N ratio after the overwrite was measured.

As a result, a stable servo tracking could be obtained and the C/N ratio after the overwrite was 41 dB.

We claim:

1. A magneto-optical recording medium comprising
   A) a substrate comprising
      i) a base having a top surface that is made of an organic resin material, the organic resin material having guide means in the form of concave portions for servo tracking with an optical beam, wherein said guide means are the only guide means in said substrate,
      ii) a dielectric layer that is contiguous with the top surface of said base and that covers the entire top surface of said base and the concave portions that form the guide means, and
      iii) a leveling layer on said dielectric layer that covers said guide means and has a flat top surface,
      wherein said dielectric layer has a refractive index higher than those of said organic resin material in which said guide means are formed and said leveling layer, and
   B) a magneto-optical recording layer over said substrate, said magneto-optical recording layer being capable of being directly overwritten by modification of power level and/or pulse duration of a recording optical pulse.

2. A medium according to claim 1 wherein said base is made entirely of a polycarbonate resin.

3. A medium according to claim 1 wherein said guide means are grooves having a depth of more than 40 nm.

4. A medium according to claim 3 wherein said guide means have a depth of more than 70 nm.

5. A medium according to claim 1 wherein said dielectric layer has a refractive index of not less than 1.6 for the wavelength of light of said optical beam for servo tracking.

6. A medium according to claim 5 wherein said refractive index of said dielectric layer is not less than 1.8 for the wavelength of light of said optical beam for servo tracking.

7. A medium according to claim 1 wherein said dielectric layer is made of an inorganic nitride, an oxide or both an inorganic nitride and an oxide.

8. A medium according to claim 7 wherein said dielectric layer is made of.

9. A medium according to claim 7 wherein said dielectric layer has a thickness in a range of 20 nm to 160 nm.

10. A medium according to claim 1 wherein said leveling layer is a cured resin layer.

11. A medium according to claim 1 wherein said leveling layer has a thickness such that the portion on said guide means is in a range of 50 nm to 500 nm.

12. A medium according to claim 9 wherein said dielectric layer has a uniform thickness along the top surface of said base thereby retaining a geometric configuration of the top surface of said base.

13. A medium according to claim 1 wherein said substrate has a present reflection of said optical beam for servo tracking of at least 20%.

14. A medium according to claim 1, wherein another dielectric layer is disposed on said leveling layer and under said magneto-optical recording layer.

15. A medium according to claim 1, wherein said magneto-optical recording layer is disposed directly on said leveling layer.

* * * * *